UNITED STATES PATENT OFFICE.

STANISLAS BARBIER AND CHARLES H. COIFFIER, OF PARIS, FRANCE.

COMPOSITION TO BE USED AS A SUBSTITUTE FOR HARD INDIA-RUBBER, CELLULOID, IRON, AND THE LIKE.

SPECIFICATION forming part of Letters Patent No. 304,775, dated September 9, 1884.

Application filed March 8, 1883. (Specimens.)

*To all whom it may concern:*

Be it known that we, STANISLAS BARBIER and CHARLES HENRI COIFFIER, of Paris, France, have invented an Improved Composition to be Used as a Substitute for Hard India-Rubber, Celluloid, Ivory, and the Like; and we do hereby declare that the following is a full, clear, and exact description of the same.

Our invention relates to a new and improved composition or material which may be substituted with advantage for hard rubber, celluloid, ivory, and other like substances in all their applications.

This composition essentially consists in the mixture of ivory waste or dust with pieces of horn. These substances may be agglomerated by means of any suitable agglutinative fluid; but we prefer employing for this purpose albumen, such as is found in eggs.

In order to give a colored marble-like appearance to our material, we may suitably color the ivory waste or dust by means of any suitable dye before it is mixed up with the horn forming the body of the mass.

Our material may be used in a number of different ways, and we mention hereinafter but few of its applications. It may be used in the manufacture of all articles, (toys, boxes, &c.,) and it can be carried or worked either by hand or in the lathe, or it may be molded into the form of any suitable article. The articles so manufactured may be inlaid with any vegetable or mineral substances.

Our material may also be employed in the manufacture of emery-wheels, which is thus rendered more simple and economical. Moreover, this composition, having very high insulating properties, and being able to be cut into very thin sheets and plates, may be advantageously used in the manufacture of all electric apparatus, lamps, dynamo-machines, and others.

We mix the finely-powdered ivory in suitable proportion with the pieces of horn and then with the albumen, stirring the mixture, then place it in molds, and let it dry. The result will be a translucent mass having streaks of horn therein, which add to its strength and give it a beautiful appearance.

We claim—

As a substitute for hard rubber, celluloid, ivory, and the like, the composition consisting of the mixture of ivory waste or dust and horn agglomerated by means of albumen, substantially as described and for the purposes set forth.

STANISLAS BARBIER,
CHARLES HENRI COIFFIER.

Witnesses:
ROBT. M. HOOPER,
JEAN BAPTISTE ROLLAND.